United States Patent [19]
Passera, deceased et al.

[11] 3,942,759
[45] Mar. 9, 1976

[54] MAGNETICALLY-ACTUATED MEMBRANE VALVE

[75] Inventors: Walter Passera, deceased, late of Stuttgart, Germany, by Ludwig Passera, sole heir; Heinz Gand, Stuttgart, Germany

[73] Assignee: Robert Bosch GmbH, Stuttgart, Germany

[22] Filed: Sept. 24, 1973

[21] Appl. No.: 399,933

[30] Foreign Application Priority Data
Sept. 22, 1972 Germany............................ 2246574

[52] U.S. Cl................................ 251/129; 251/141
[51] Int. Cl.²........................................ F16K 31/06
[58] Field of Search................... 251/129, 141, 139; 137/625.65

[56] References Cited
UNITED STATES PATENTS

| | | | |
|---|---|---|---|
| 2,843,147 | 7/1958 | Penther............................ | 251/141 X |
| 3,004,720 | 10/1961 | Knapp et al..................... | 251/141 X |
| 3,093,359 | 6/1963 | Woody............................. | 251/368 X |
| 3,269,689 | 8/1966 | Lee................................... | 251/129 X |
| 3,521,854 | 7/1970 | Leiber et al..................... | 251/141 X |
| 3,575,199 | 4/1971 | Beattie............................. | 251/129 X |
| 3,817,488 | 6/1974 | Mack............................... | 251/141 X |

FOREIGN PATENTS OR APPLICATIONS

| | | | |
|---|---|---|---|
| 599,652 | 6/1960 | Canada............................. | 251/129 |

*Primary Examiner*—Arnold Rosenthal
*Attorney, Agent, or Firm*—Edwin E. Greigg

[57] ABSTRACT

A magnetically-actuated membrane valve for controlling and/or regulating the flow of a liquid medium is described which valve comprises a control membrane fixedly clamped in a valve housing, and an armature frictionally connected with the membrane, which armature is arranged on that side of the membrane which faces away from the exciting coil and from the magnet core of the solenoid, whereby the magnetic flux flows through the membrane, especially for the control of the flow of a liquid which serves as control means in a fuel injection system.

22 Claims, 4 Drawing Figures

MAGNETICALLY-ACTUATED MEMBRANE VALVE

BACKGROUND OF THE INVENTION

The invention relates to a solenoid membrane valve for controlling and/or regulating the flow of liquid media, which valve comprises a membrane fixedly clamped in a valve housing, and an armature frictionally connected with the membrane.

Particularly, in the case of fuel injection systems, it is required to intervene in an automatic control circuit by means which are inexpensive to manufacture, but operate accurately, in order to change the proportions prevailing in the circuit. In a fuel injection system, such change will be in the proportionality of the aspirated amount of air and the injected amount of fuel. This proportionality is changed in dependence on engine data, such as rpm, load, temperature and composition of the exhaust gases, in order to combust the fuel as completely as possible, thereby avoiding or strongly reducing the formation of toxic exhaust gases, while maintaining the greatest possible efficiency of the internal combustion engine and a minimum of fuel consumption. As in the case of many other control systems with similar requirements, it has been found in such automatic fuel injection control systems that liquid is a highly suitable control medium owing to its non-compressibility with preservation of its fluid properties.

Especially when using electrical means for measuring the amount of air or metering the amount of fuel, a solenoid valve is usually an important element of the control system, a magnetically controlled membrane valve having a flat seat being preferred as such element. Apart from the fact that such a valve operates practically free from hysteresis, its flat seat with the cross-sectional area of its annular valve passage produces at short strokes a linear relationship between the stroke of the membrane and the cross-sectional area of the flow passage.

OBJECTS AND SUMMARY OF THE INVENTION

It is therefore an object of the invention to provide a novel valve of the aforementioned type, in which the above-described requirements are fulfilled better than in the known valves, which novel valve is, in particular, less expensive to manufacture.

This and other objects are attained according to the invention by providing a valve of the type described, wherein the armature of the solenoid is arranged on that side of the membrane which faces away from the exciting coil and from the magnetic core of the solenoid, whereby the magnetic flux flows through the membrane, especially for the control of the flow of liquids which serve as control means in a fuel injection system. According to a feature of the invention, the armature is pressed against the membrane by the magnetic flux flowing through the membrane. In known valves, the armature of the magnet is affixed to the membrane, thereby causing a change in the shape of the latter, which change will have a negative effect on the control of the medium. A further advantage of the novel valve according to the invention resides in its small size, and, if necessary, in the easy separability of the space containing the exciting coil from the control space.

In an advantageous embodiment of the invention the armature serves at the same time as a spring retainer of a control spring, being preferably manufactured from soft-magnetic material and having the shape of a cup, and encircling a sleeve which bears the valve seat. According to another advantageous embodiment of the invention the armature is mounted and radially guided on a guiding membrane. The armature is suspended to be axially displaceable and free from friction, preferably by means of a rolled flange portion. Thereby mechanical friction which would automatically lead to hysteresis is avoided. In this case the guiding membrane is made in a known manner of axially soft and radially rigid material. The guiding membrane can be axially attachable by means of a soft-iron ring of the same diameter which axially engages in the stator bore. Thus no additional dividing plane of the housing is needed for clamping-in the guiding membrane and the frontal face of the casing turned toward the membrane can be lapped in a single working step. A narrow radial play is provided between the soft-iron ring and the armature-spring retainer, in order to ensure minimum losses of magnetic flux. The soft-iron ring can be provided, on the side thereof facing away from the membrane, with an inner flange and the armature-spring retainer can be provided with an outer flange which extends beyond that side of the inner flange of the soft-iron ring which faces away from the membrane. This prevents the formation of unilateral radial forces due to eccentricity of the spring retainer in the soft-iron ring, resulting from manufacture thereof. Otherwise, such radial forces could effect a tilting of the spring retainer and may even cause magnetic adhesion during contact of the spring retainer and the soft-iron ring; also, avoidance of such radial forces affords the advantage of an additional axial power gain. Moreover, the guiding membrane can serve advantageously for controlling the magnetic flux, for which purpose it is preferably made of soft-magnetic material having a high saturation inductance. In this case, no additional and uncontrolled magnetic radial and/or axial forces will be exerted on the spring retainer.

It is important that valves of this type should be constructed of small radial extensions, so that they may be integrated readily into other control units. Furthermore, the clamped-in diameter of the membrane should be as small as possible, in order to keep the magnetic forces small, when, for example, different pressures prevail on the two sides of the control membrane, for the force of the membrane increases proportionally with the second power of the clamped-in diameter of the control membrane, and the diameter of the guiding membrane is largely dependent on the diameter of the control membrane. According to the invention, the head of the spring retainer should have the smallest possible diameter, and to this end, the control spring can be supported by the spring retainer in a range which is located, taken from the control membrane, axially behind the guiding membrane.

According to a further advantageous embodiment of the invention, the armature-spring retainer is axially displaceable and radially guided in the housing. In this case, it is important that there should be only a minimal clearance between the two members being displaceable relative to one another. In order to avoid any magnetic adhesion, the surfaces of members facing towards each other, through which the magnetic flux passes, can be coated with a non-magnetic material. In order to reduce expenses, a ring of soft-magnetic material, affixed to the housing, can be arranged between the armature-spring retainer and the housing, across which a locally large magnetic flux density is possible. The casing on the contrary, can be manufactured from less expensive material, since the magnetic flux density therein is smaller. In order to avoid a magnetic short circuit, the control spring, a tubular socket, or a casing part containing the socket, may consist of non-magnetic material. Washers made of non-magnetic material may also be used, provided their magnetic resistance is sufficient.

For some control purposes it is necessary that different pressures should prevail on both sides of the membrane. Therefore, according to the invention, the chambers on both sides of the membrane may be in communication with each other, preferably by way of a throttle bore. When a given pressure prevails in one chamber, this throttle bore brings about a constant pressure drop in the direction toward the other chamber. In addition, in accordance with the invention, oscillations of constant, small amplitude and constant frequency can be superimposed on the applied basic operating current, in order to eliminate the occurrence of adhesion hysteresis.

The invention will be better understood, and further objects and advantages will become apparent from the ensuing detailed specification of a preferred but merely exemplary embodiment taken in conjunction with the drawings.

DESCRIPTION OF THE PREFERRED EMBODIMENT

Figure 1:
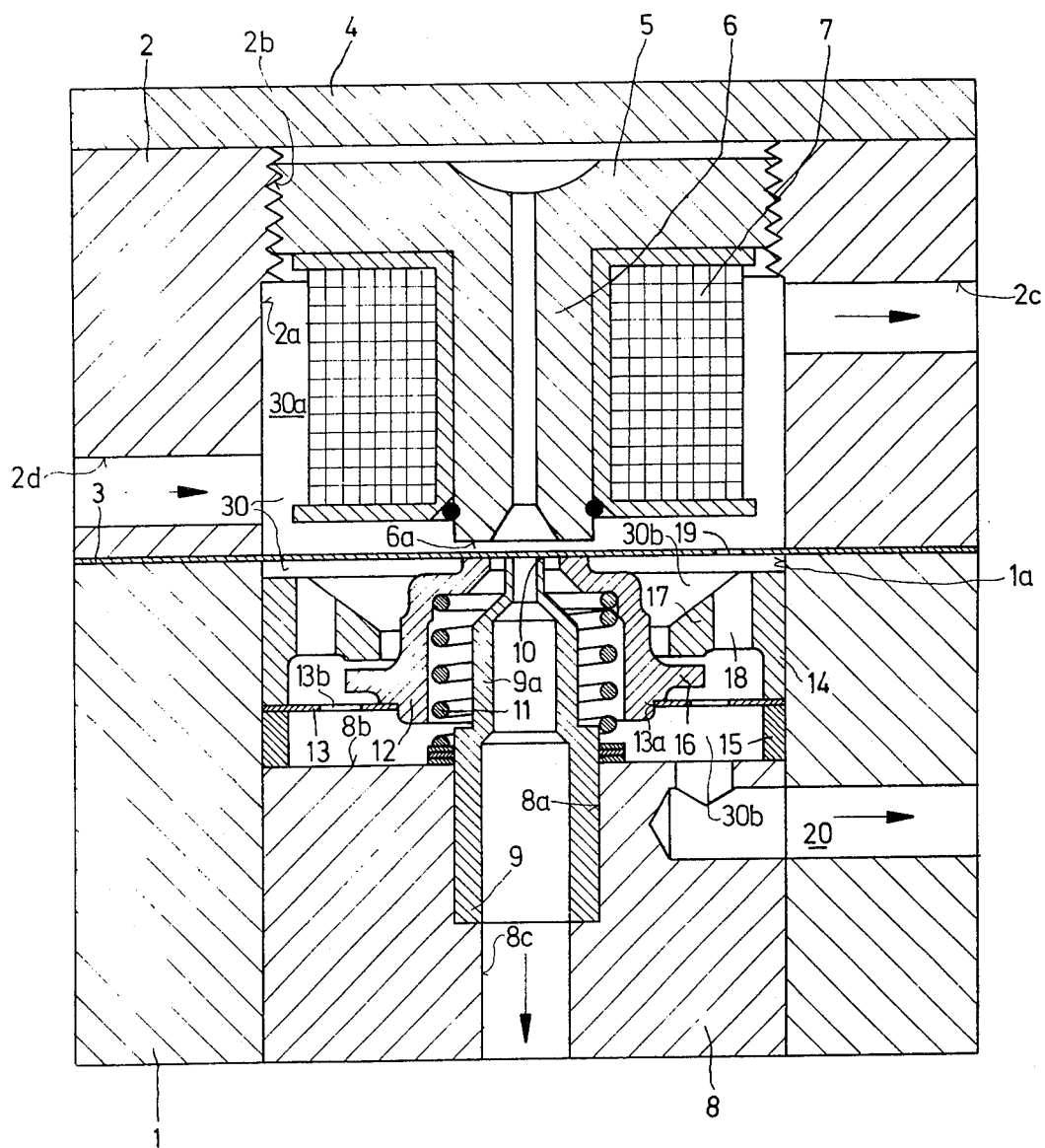
FIG. 1 shows in axial view a preferred embodiment of the solenoid membrane valve according to the invention.

In a multiple-part housing of a solenoid membrane valve, a membrane 3 is clamped between the housing elements 1 and 2. Housing element 2 is closed by means of a top 4, and has a central bore 2a into a threaded portion 2b of which a magnetic core 5 having an external thread and bearing a plug portion 6 is screwed in position. About plug 6 an exciting coil 7 is affixed to core 5. The free end face 6a of plug 6 determines the maximal stroke of the membrane 3. In the central bore 1a of housing element 1, which registers with central bore 2a, there is affixed an insert 8 which is preferably manufactured from magnetically non-conductive material. In the central bore 8a of insert 8, there is seated a valve sleeve 9 whose reduced diameter portion 9a facing toward membrane 3 constitutes a valve seat 10. A coil spring 11 serving as a control spring and surrounding sleeve portion 9a, is seated with its one end on the inside face 8b of insert 8 and with its other end in a cup-shaped spring retainer 12, thereby urging the latter into contact with membrane 3. The cup-shaped spring retainer 12 serves as the armature of solenoid 7.

In the embodiment shown in FIG. 1, armature 12 is fixedly mounted in the central opening 13a of a guiding membrane 13, which is clamped between two rings 14 and 15 inserted fixedly into the central bore 1a of housing element 1. The cup-shaped armature 12 has an outer flange 16 which reaches over an inwardly extending flange 17 of ring 14, in order to provide particularly favorable flux-transmitting surfaces for the magnetic flux in the axial direction. Furthermore, there are provided in ring 14 axial bores 18, through which fuel flows in its passage past seat 10, to fill the entire space 30 of the housing even when flange 16 is in contact with flange 17. In this embodiment, a higher fuel pressure prevails in chamber 30a of interior space 30 which is surrounded by element 2 than in chamber 30b which is enclosed by elements 1 and 8. A constant pressure drop between the two chambers 30a and 30b which are separated by the membrane 3, is caused by a throttle 19 through which fuel continually flows from chamber 30a into chamber 30b. Moreover, a larger amount of fuel flows through chamber 30a from entry bore 2d to exit bore 2c as indicated by arrows in order to effect a cooling of the exciting coil 7. From chamber 30b the liquid passing through throttle 19 then flows either past the valve seat 10 and out of discharge bore 8c to another control pressure valve (not shown), whenever armature 12 (along with membrane 3) is attracted by solenoid 7; or, pressure-regulated, via axial duct 18, orifices 13b in guiding membrane 13 into discharge bore 20 in element 1 to a fuel-consuming device. Depending on which current intensity and/or current frequency is applied to the exciting coil 7, the stroke of membrane 3 can correspond to the applied current intensity (proportional actuation), or the membrane can be operated in cycles carrying out a full stroke in each cycle (integral actuation). In either case, the difference between the pressures prevailing on both sides of the membrane is thus controlled.

The magnetic core 5 has a bore 31 formed therein. The bore 61 serves as a connecting bore for the chamber 30a to the space 32 between the core 5 and the cover 4.

Figure 2:
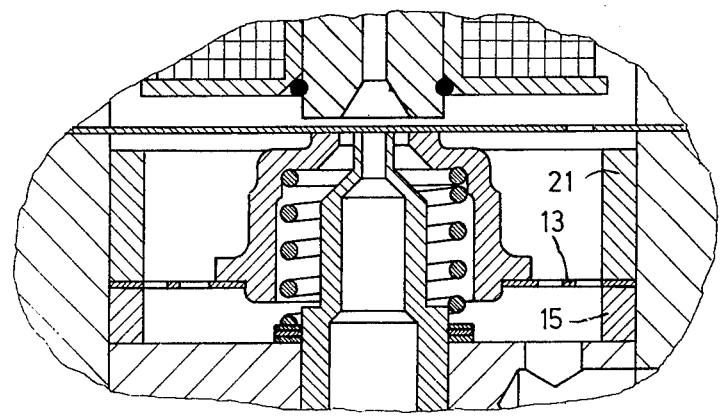
FIGS. 2 to 4 show in partial sectional view variations of the armature of the valve shown in FIG. 1.

In the embodiment shown in FIG. 2, the magnetic flux does not pass via a special annular member as provided by annular flange 17 in the preceding embodiment, but, instead, via the guiding membrane 13 which is manufactured from suitable soft-magnetic material, and has an adequate cross-sectional area.

A ring 21, by means of which the guiding membrane 13 is fixedly held on ring 15 is preferably manufactured of soft-magnetic material in order to facilitate the passage of the densified magnetic flux from housing element 1 to the guiding membrane.

Figure 3:
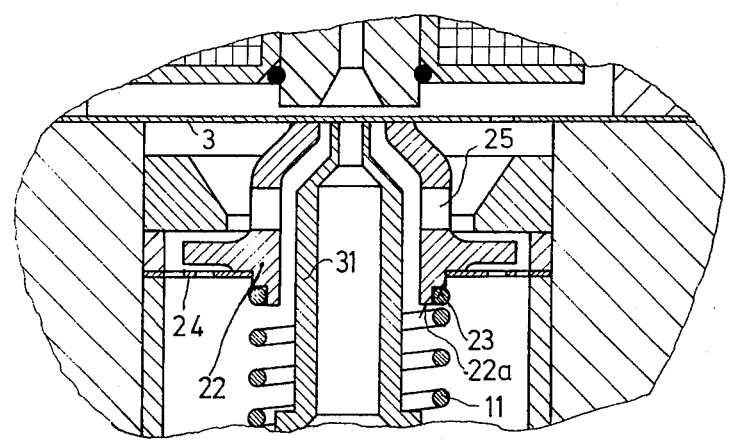

In contrast to the magnetic system shown in FIG. 1, the magnetic system shown in FIG. 3 comprises a cup-shaped armature 22 of much smaller diameter, thus avoiding the need for too large an electromagnet even in the case of larger differences occurring between the pressures on both sides of membrane 3, as the required control forces increase with the square of the membrane diameter. The smaller diameter of armature 22 is made possible by supporting control spring 11 in this embodiment on a shoulder 23 in the armature cup rim 22a facing away from membrane 3 and beneath the cup zone in which the guiding membrane 24 engages armature 22, rather than having the spring located inside the cup of the armature as is the case in the embodiment of FIG. 1. In order to maintain an adequately soft characteristic spring curve, the length of control spring 11 must not be shortened, wherefor the valve sleeve 31 is slightly longer than the valve sleeve 9 of the embodiments shown in FIGS. 1 and 2, but has a much smaller diameter. Radial bores 25 are provided in the armature for the flow of fuel therethrough.

Figure 4:
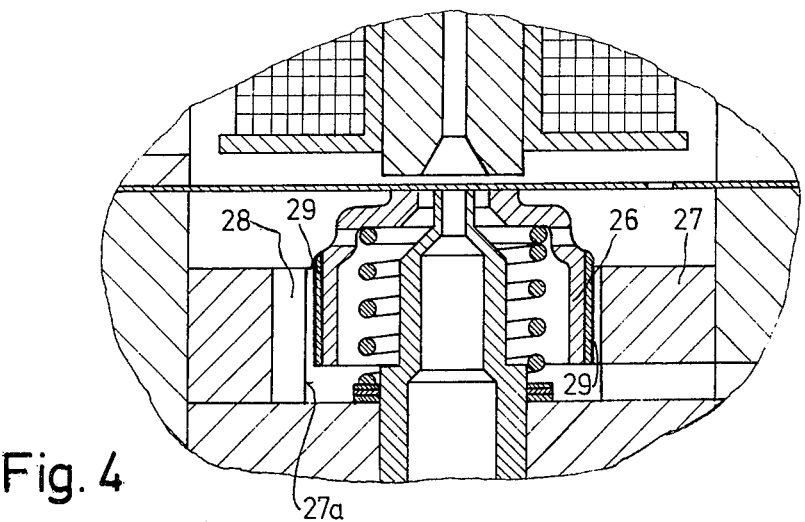

In the embodiment of the magnetic system shown in FIG. 4, the cup-shaped armature 26 is inserted in a soft-iron ring 27 which is provided with grooves 28 for fuel flow in the wall of its central bore 27a. A coating 29 of non-magnetic material is provided on the outer cup surface of the armature 26 facing ring 27. Thereby, magnetic adhesion due to one-sided compression of the spring 11, and the resulting eccentric positioning of the armature, can be avoided.

According to the invention, a coating of non-magnetic material may be provided advantageously on all surfaces which must undergo displacement, relative to each other, in order to avoid magnetic adhesion. All other members which are not important for the magnetic flux can be made from less expensive non-magnetic material.

That which is claimed is:

1. A magnetically-actuated membrane valve for the control or regulation or both of the flow of a liquid medium comprising: a valve housing; a control membrane held in position in said housing; a solenoid coil and a magnetic core on one side of said membrane; and an armature on the other side thereof, in said housing, whereby the magnetic flux between the solenoid coil and armature passes through said membrane; and a valve seat obturated by said control membrane when said valve is closed, wherein said valve seat is located on the same side of said control membrane as said armature.

2. A magnetically actuated membrane valve as described in claim 1, wherein said control membrane is made of magnetically conductive material, and wherein said control membrane supplements the magnetic response of said armature.

3. A magnetically-actuated membrane valve as described in claim 1, wherein said valve seat defines a positional plane, and wherein said control membrane is held in position in said positional plane.

4. A magnetically-actuated membrane valve as described in claim 1, further comprising control spring means in said housing, one end of which spring means is supported at said armature, and valve sleeve means defining said valve seat, and wherein said armature is made of soft magnetic material, is cup-shaped and surrounds said valve sleeve means.

5. A magnetically actuated membrane valve as described in claim 4, wherein said housing comprises an insert in the wall of the housing on the side of said control membrane facing away from said solenoid coil and core, and a tubular member projecting inwardly from said insert toward said control membrane, the end of said tubular member adjacent said control membrane bearing said valve seat, and wherein at least one of said control spring, tubular member and insert is of non-magnetic material.

6. A magnetically-actuated membrane valve as described in claim 4, wherein said armature is radially guided and axially displaceable in said housing.

7. A magnetically-actuated membrane valve as described in claim 6, wherein the external surface of said armature facing the internal wall of said housing is coated with a layer of non-magnetic material.

8. A magnetically-actuated membrane valve as described in claim 6, further comprising a ring of soft magnetic material affixed in said housing and disposed between the latter and said armature.

9. A magnetically-actuated membrane valve as described in claim 8, wherein at least one of the faces of said ring and of said cup-shaped armature, located opposite one another, bears a plurality of axial grooves for the guidance of fuel flow therealong.

10. A magnetically-actuated membrane valve as described in claim 4, further comprising a guiding membrane, wherein said armature includes a rolled-in flange, and wherein said armature is suspended with the aid of said flange on said guiding membrane for radial guidance and axial frictionless displacement in said housing.

11. A magnetically-actuated membrane valve as described in claim 10, wherein said guiding membrane is of magnetically conductive material and the magnet flux from said solenoid through said control membrane extends through said guiding membrane.

12. A magnetically-actuated membrane valve as described in claim 10, wherein said guiding membrane is of soft magnetic material having a high saturation induction.

13. A magnetically-actuated membrane valve as described in claim 10, further comprising a soft iron retaining ring holding the periphery of said guiding membrane fastened against displacement in an axial direction in said housing.

14. A magnetically-actuated membrane valve as described in claim 13, wherein said soft iron ring and said armature are arranged in said housing on the same side of said control membrane with a small radial play between said ring and said armature.

15. A magnetically-actuated membrane valve as described in claim 13, wherein said soft iron ring is provided on the side thereof facing away from said control membrane with an internal flange and wherein said armature has an external flange extending in radial direction in said housing, said external flange extending beyond the face of said internal flange on the side of the latter facing away from said control membrane, 16. A magnetically-actuated membrane valve as described in claim 15, wherein the faces of said internal and said external flange facing toward each other extend in parallel planes.

17. A magnetically-actuated membrane valve as described in claim 10, wherein said control spring means is housed in the interior of the cup of said armature, being supported with its one end against the bottom of said cup.

18. A magnetically-actuated membrane valve as described in claim 10, wherein one end of said control spring means is supported on the cup rim of said armature facing away from said control membrane and from said guiding membrane, said spring means extending in the direction of the cup axis of said armature.

19. A magnetically-actuated membrane valve as described in claim 1, wherein the face of said magnetic core turned toward said membrane is coated with a layer of non-magnetic material.

20. A magnetically-actuated membrane valve for the control or regulation or both of the flow of a liquid medium comprising: a valve housing; a control membrane held in position in said housing; a solenoid coil and a magnetic core on one side of said membrane; and an armature on the other side thereof, in said housing, whereby the magnetic flux between the solenoid coil and armature passes through said membrane wherein said housing comprises two chambers separated by said control membrane, one of said chambers communicating with an entry bore of the housing and the other of said chambers communicating with at least one discharge bore of the housing, said control membrane comprises throttle means, and said two chambers of said housing on both sides of said control membrane are in free communication with one another through said throttle means.

21. A magnetically-actuated membrane valve as described in claim 20, wherein said throttle means are located in said control membrane in the peripheral zone of the latter.

22. A magnetically-actuated membrane valve as described in claim 1, comprising means for applying to said solenoid coil a base control current on which is superimposed oscillations of constant small amplitude and constant frequency.

* * * * *